United States Patent [19]
Fan

[11] Patent Number: 5,634,382
[45] Date of Patent: Jun. 3, 1997

[54] SIMPLE AND IMPROVED STRUCTURE OF AN ERGONOMIC DEVICE FOR BICYCLES

[76] Inventor: Jeeng-Neng Fan, No. 34, Alley 10, Lane 54, Sec. 2, Yangsin Rd., Yangmei, Taoyuan, Taiwan

[21] Appl. No.: 506,767

[22] Filed: Jul. 26, 1995

[51] Int. Cl.$^6$ ........................................................ B62M 3/00
[52] U.S. Cl. ........................................ 74/594.1; 74/594.4
[58] Field of Search ............................... 74/594.1, 594.3, 74/594.4, 594.7

[56] References Cited

U.S. PATENT DOCUMENTS

| | | | |
|---|---|---|---|
| 558,463 | 4/1896 | Bascom | 74/594.1 |
| 610,923 | 9/1898 | Scheeren | 74/594.3 |
| 629,921 | 8/1899 | Reynolds | 74/594.1 |
| 700,492 | 5/1902 | Henstock | 74/594.7 |
| 2,749,771 | 6/1956 | Pearl | 74/594.4 |
| 4,080,017 | 3/1978 | Meyer | 74/594.4 X |
| 4,429,950 | 2/1984 | Zwahlen | 74/594.4 X |
| 5,199,324 | 4/1993 | Sain | 74/594.4 |

FOREIGN PATENT DOCUMENTS

| | | | |
|---|---|---|---|
| 554227 | 6/1923 | France | 74/594.4 |
| 898926 | 5/1945 | France | 74/594.4 |
| 1252601 | 12/1960 | France | 74/594.4 |
| 87537 | 5/1895 | Germany | 74/594.4 |
| 9822 | 12/1897 | Sweden | 74/594.4 |
| 5798 | of 1898 | United Kingdom | 74/594.4 |

*Primary Examiner*—Charles A. Marmor
*Assistant Examiner*—MaryAnn Battista
*Attorney, Agent, or Firm*—Morton J. Rosenberg; David I. Klein

[57] ABSTRACT

The ergonomic device bicycles includes an auxiliary crank securable on the end of the pedal crank of a bicycle. An arm portion of the auxiliary crank is outwardly inclined approximately five degrees. Following the installation of the bicycle pedal to the arm portion of the auxiliary crank, the pedal is thereby canted upward by approximately five degrees. By this arrangement, the user's feet are prevented from slipping outward and the vectored force of the feet is transferred at maximum efficiency. Additionally, the outer ends of the pedals are spaced further from the ground and thereby allow for a greater lean of the bicycle in a turn.

1 Claim, 5 Drawing Sheets

SIMPLE AND IMPROVED STRUCTURE OF AN ERGONOMIC DEVICE FOR BICYCLES

BACKGROUND OF THE INVENTION

With the advanced transportation of today, there are transportation tools such as bicycles that are compact, lightweight, economical and motorized. Bicycles have not become obsolete, but have undergone continuous improvement through innovative research and development by manufacturers that has enabled them to be effective transportation tools, while also serving as recreation products. Regarding the improvements to various parts of bicycles, the conservation of physical energy when riding has now become among the most important focus of improvement sought by manufacturers and users. How to simply and improve the material structure of the frame, reduce the weight and utilize transmission devices to change front and rear chain sprocket ratios are all ergonomic measures relied upon by manufacturers.

In addition to the aforementioned methods and measures to obtain more effective and safe human interaction when riding, there have been previous attempts to provide devices to ergonomically enhance bicycles. An example is disclosed in U.S. Pat. No. 601,923, showing a device that effectively increases efficiency with an auxiliary crank actively installed onto each pedal crank. The pedals are then installed on the auxiliary cranks such that when the rider places both feet on the pedals, the aforesaid auxiliary cranks follow the bending and lengthening of the legs in a natural manner and at an angle appropriate to provide support. Such thereby enables the actual and effective cancellation of dead angles, dissipating the force exerted by the feet so that the force from the legs is transferred at greater efficiency which effectively succeeds in achieving ergonomic objectives. Therefore, the aforesaid force generated by the motion of the legs and feet are transferred with more fluidity and thereby achieves the objective of compliance with human engineering requirements. The aforesaid Patent was granted because the dead angles encountered by the force of the feet were eliminated and, therefore, genuinely and fully provided effective ergonomic results in actual application (especially the conservation of human energy provided when a bicycle so equipped was ridden uphill). However, the individual registering the aforesaid Patent observed a number of major shortcomings related to the actual installation and utilization that would eventually require improvement. As indicated in U.S. Pat. No. 610,923, the method of installing the aforesaid auxiliary crank onto the pedal crank consists of screwing the extension sleeve onto the threaded adjustment shaft against the anti-friction ball bearings, after which the aforesaid assembly is screwed into the threaded hole of the pedal crank to achieve a mechanical positioning capable of free rotation. However, since the extension sleeve is only assembled to the threaded adjustment shaft via screw-type threads, when the threaded adjustment shaft is screwed to the pedal crank, the extension sleeve is subjected to the mechanical effects of the screwing process and consequently shifts in position. As a result, when the threaded adjustment shaft is tightened, the aforesaid extension sleeve exerts a greater contact force onto the anti-friction ball bearings, which in turn leads to the shortcoming of inhibiting the smooth rotation of the auxiliary crank. In the alternative, if the threaded adjustment shaft is not tightened to a sufficient degree, then the aforesaid shaft is extremely susceptible to loosening, thereby creating a dangerous situation. Therefore, the aforesaid installation requires continuous adjustment and screwing attempts such that in actual operation, the assemblage presents obvious disadvantages of excessive difficulty and inconvenience. Furthermore, since the auxiliary crank is installed onto the pedal crank, after the pedal is installed onto the aforesaid auxiliary crank, the distance between the aforesaid pedal and the ground is reduced and as a direct result, since the ends of the pedal cranks installed on conventional bicycle pedals are close to the ground, the aforesaid auxiliary pedal is only capable of smooth operation when a bicycle so equipped is ridden in a straight line. However, when the aforesaid bicycle is leaned over during the execution of a turn, the end of the aforesaid pedal poses the dangerous situation of easily making contact with the ground. Therefore, as disclosed in the foregoing elaboration, the auxiliary crank component of the aforesaid U.S. Pat. No. 610,923 is not only characterized by the shortcoming of difficult and inconvenient installation, but also has the disadvantage of being dangerous in actual utilization. Meanwhile, a certain manufacturer once introduced a device similar in nature to that of U.S. Pat. No. 610,923. In U.S. Pat. No. 558,463, the pedal is indirectly installed to the pedal crank. However, the invention of the aforesaid Patent only consisted of installing a yoke to modify the length of the pedal crank. However, since the aforesaid yoke was mounted in an immovable configuration and, therefore, was incapable of free rotation, the aforesaid yoke was essentially precluded from eliminating the dead angles to the force exerted by the feet, and thereby offered no ergonomic advantage in bicycle riding.

SUMMARY OF THE INVENTION

The primary objective of the present invention is to provide a simple and improved structure of an ergonomic device for bicycles, wherein the aforementioned auxiliary crank accommodates an outwardly directed inclination angle of approximately five degrees for the pedal. Thus, after the installation of the pedal, the outer end of the pedal is angularly displaced approximately five degrees with respect to a horizontal reference. Under such conditions, when the bicycle is being turned and the frame is leaned at an angle, the pedal does not contact the ground, enabling not only ensured operational safety in actual application, but also the capability of direct installation on any bicycle whatsoever, to provide widespread utilization.

Another objective of the present invention is to provide a simple and improved structure of an ergonomic device for bicycles, wherein the aforementioned auxiliary crank accommodates an outwardly directed inclination angle of approximately five degrees of the pedal. Under that condition, the leg force exerted by the rider is vectored such that the sole of the foot does not slide outward or slip off, while the force exerted onto the pedal is naturally conveyed directly to the pedal crank, thereby enabling a maximization efficiency.

Yet another objective of the present invention is to provide a simple and improved structure of an ergonomic device for bicycles, wherein the pedal crank rotates freely on the aforesaid anti-friction ball bearings and the outer bearing race of the T-shaped extension sleeve of the auxiliary crank. Following the appropriate tightening of the T-shaped extension sleeve into position on the threaded shaft, a threaded nut is installed at the opposite side to ensure that the aforesaid assembly remains securely positioned. Furthermore, when a user desires to install the present invention onto a bicycle, it is only necessary to fasten the auxiliary crank to the threaded shaft in an operation that does not require any further adjustment whatsoever. Thus, an effective installation procedure that is simple, convenient and rapid in actual practice is provided.

A further objective of the present invention is to provide a simple and improved structure of an ergonomic device for bicycles that is extremely practical and progressive in actual utilization. The present invention allows uncomplicated installation and application, simple and convenient utilization, and the attainment of greater pedaling force and a reliable means of preventing ground contact by the pedals when a bicycle executes a turn.

DETAILED DESCRIPTION OF THE PREFERRED EMBODIMENT

Figure 1:
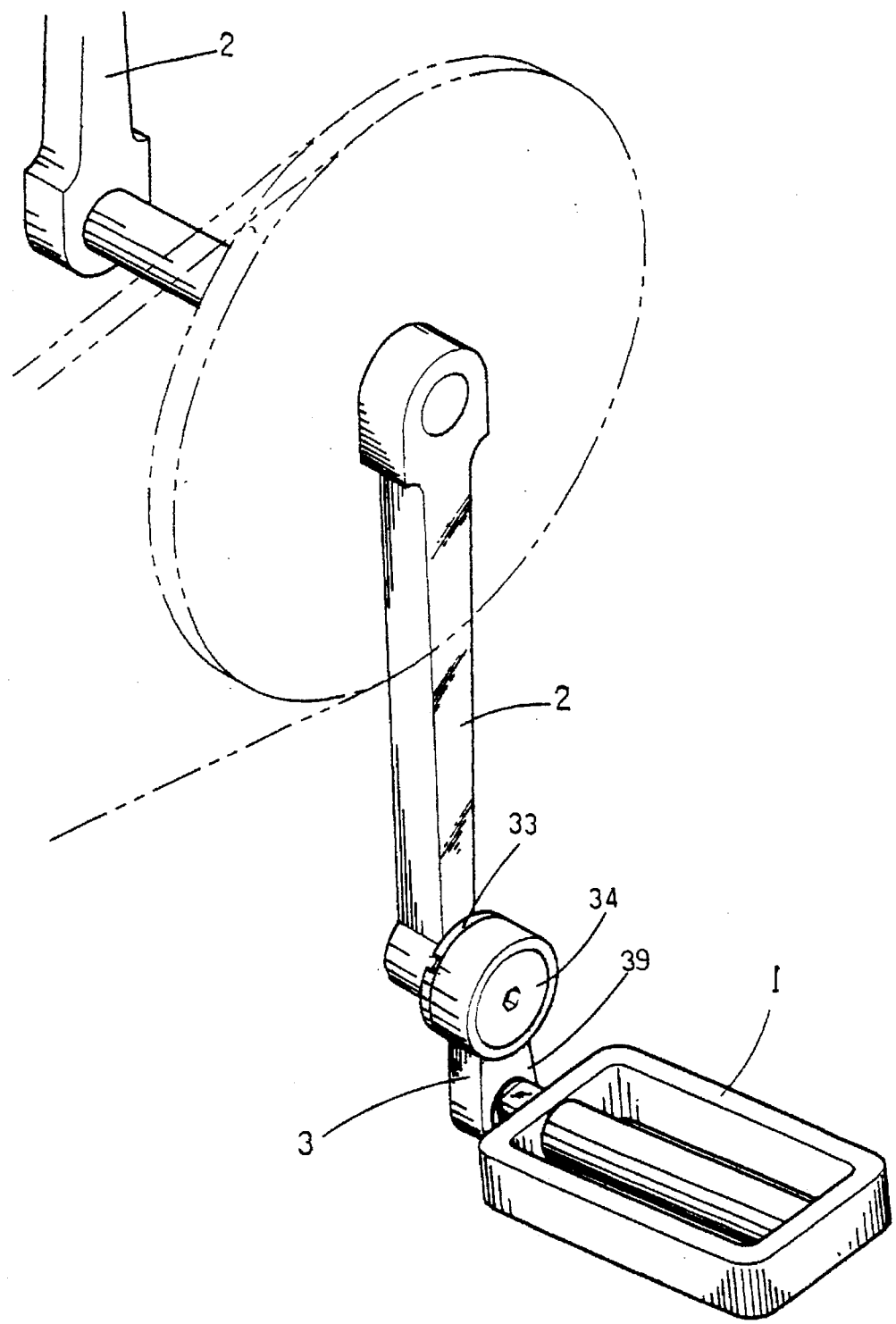
FIG. 1 is an isometric drawing of the pedal crank and the auxiliary crank of the present invention, as assembled with a pedal.
Figure 2:
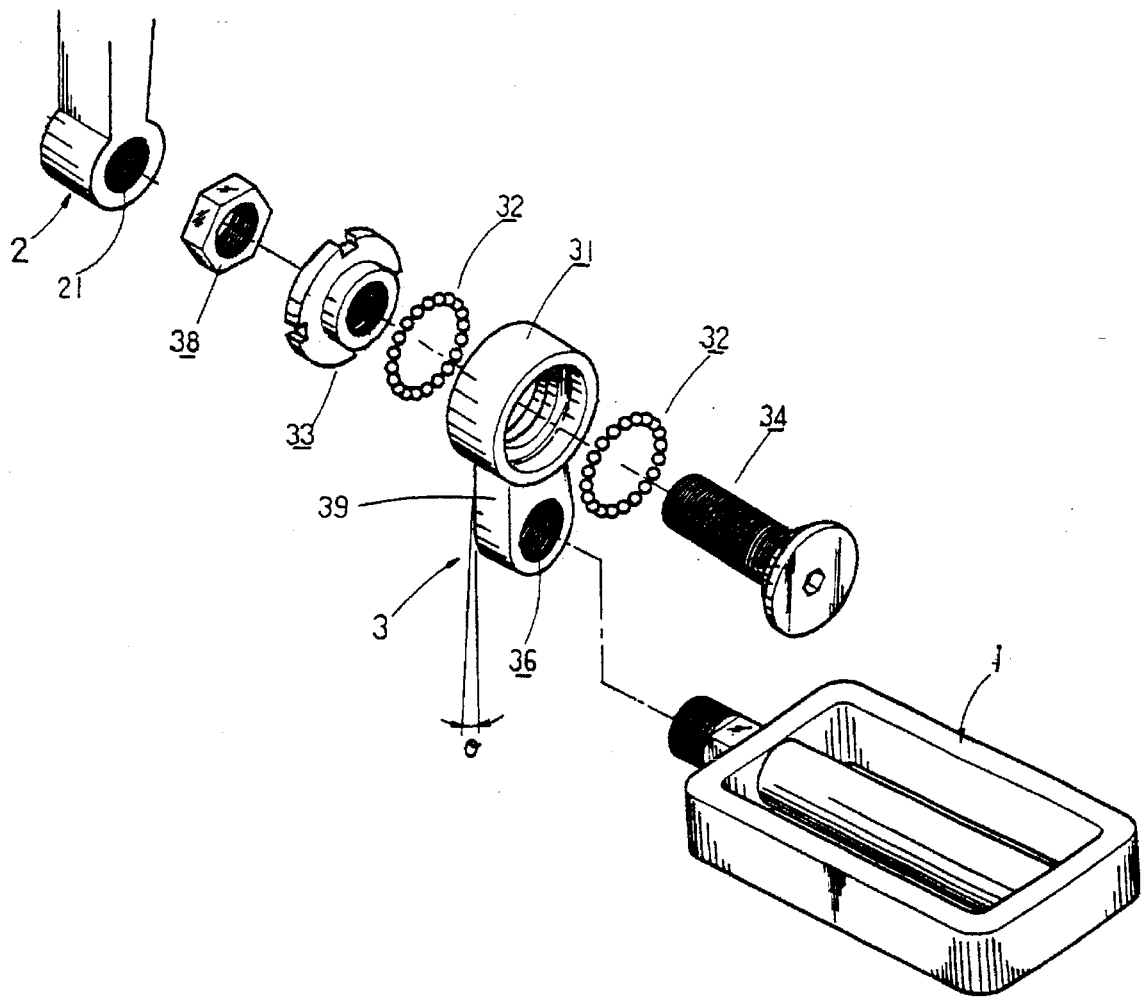
FIG. 2 is an exploded view of the structural constituents of the present invention.
Figure 3:
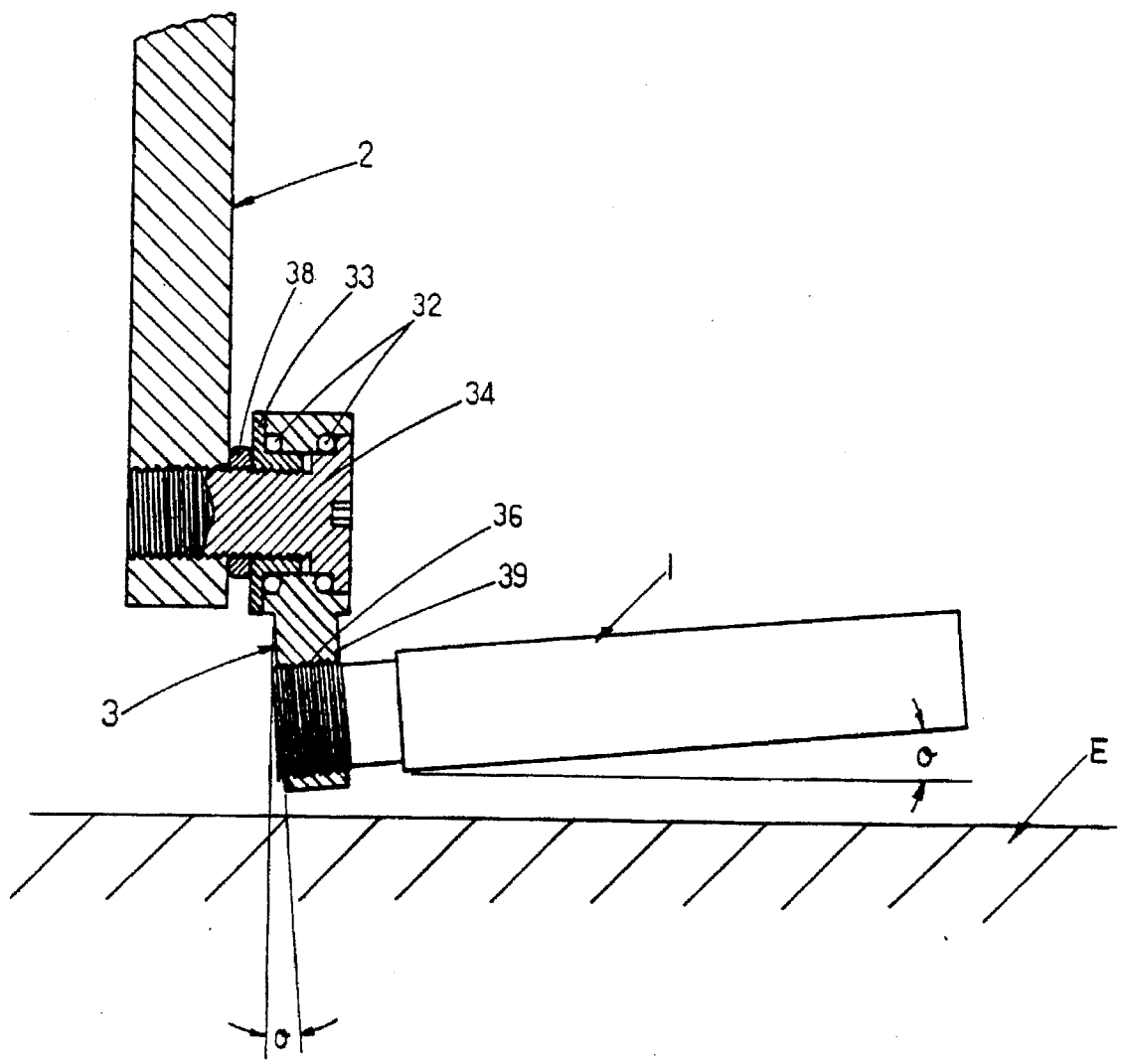
FIG. 3 is a cross-sectional drawing of the pedal crank and auxiliary crank of the present invention assembled with a pedal.

As clearly indicated in FIGS. 1, 2 and 3, the improved ergonomic device for bicycles consists of an auxiliary crank 3 installed onto the pedal crank 2 as a simple improvement which rotates freely on ball bearings 32 on the outer bearing race of the T-shaped extension sleeve 33 of the auxiliary crank 3, following insertion over and firm fastening to the threaded shaft 34. The threaded nut 38, at the opposite end of the fastening surface of shaft 34, is then tightened to ensure that the assembly remains safely secure. Furthermore, there is a threaded hole 36 formed in the arm portion 39 of auxiliary crank 3 to provide for the installation of a pedal 1. The arm portion 39 is offset with respect to the positioning collar 31 so as to be inclined approximately five degrees outwardly, an angle θ. Thus, following the installation of the pedal 1, the outer end of the pedal 1 is angularly spaced from a horizontal plane and is therefore capable of being angularly displaced by an additional five degrees by the leaning of the bicycle in a turn.

When the threaded shaft 34 is inserted into the positioning collar 31 of the auxiliary crank 3, the auxiliary crank 3 can freely rotate due to the appropriate mechanical play of the T-shaped extension sleeve 33 achieved through the degree of tightening thereof onto the threaded shaft 34. The threaded nut 38 is relied upon for tightening against one side of the T-shaped extension sleeve 33. The nut 38 enables the T-shaped extension sleeve 33 to be immovably retained into a secure position, such that the free rotation of the auxiliary crank 3 can be accomplished in advance under conditions of utmost precision and accurate settings prior to installation onto the pedal crank 2.

Whenever any user whatsoever desires to install the auxiliary crank 3 onto a bicycle, it is only necessary to quickly fasten the threaded shaft 34 of the auxiliary crank 3 directly to the threaded hole 21 of the pedal crank 2. Essentially no loosening or tightening adjustment is required and none of the aforementioned shortcomings of excessive loosening or tightening whatsoever occurs. Thus, the effective attainment of simple, convenient and rapid installation is achieved.

Figure 4:
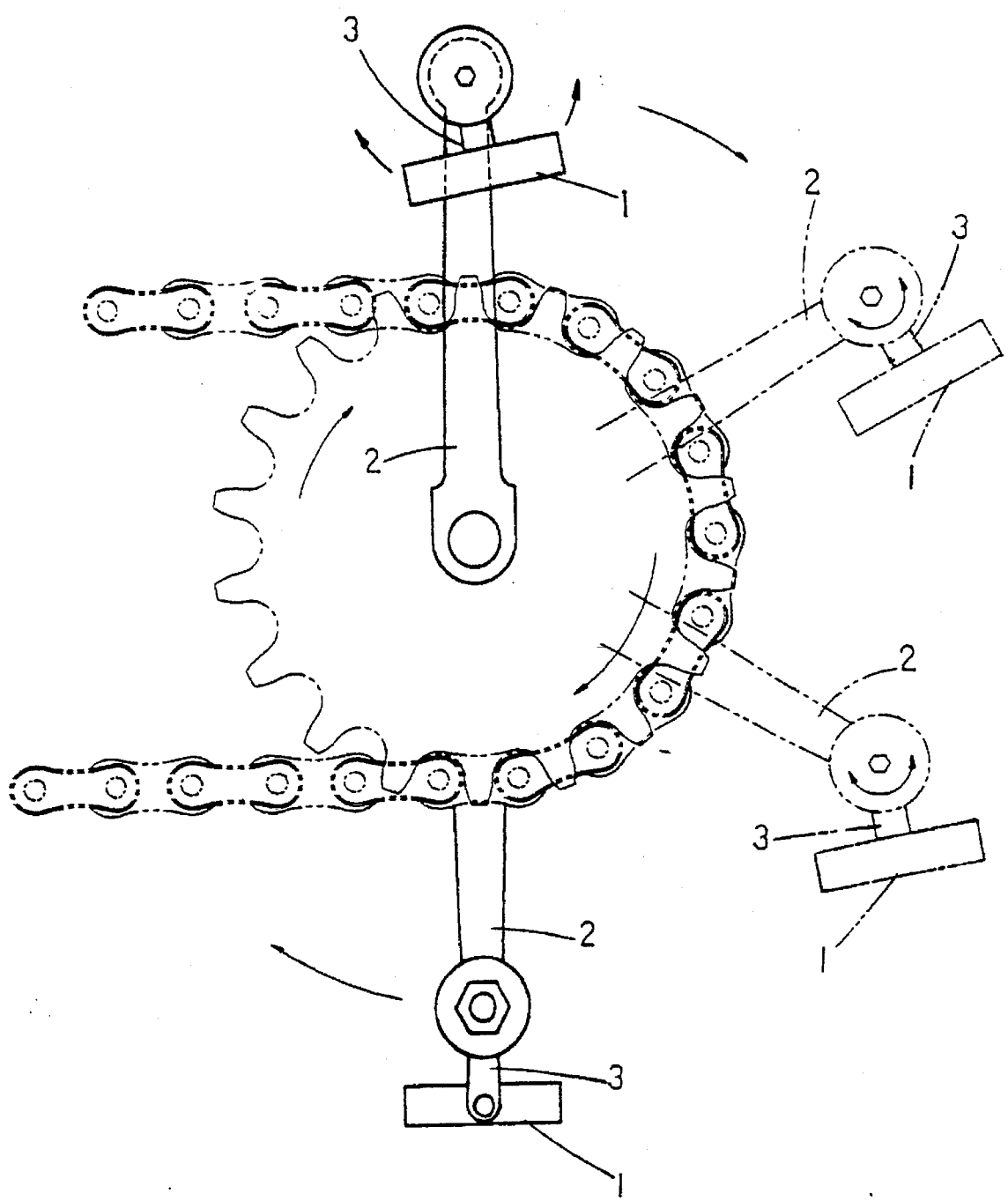
FIG. 4 is a depiction of the auxiliary crank of the present invention illustrating the dynamic relationship with the foot; and, FIG. 5 is a cross-sectional drawing of the auxiliary crank of the present invention with the pedal mounted and rotated during bicycle operation.
Figure 5:
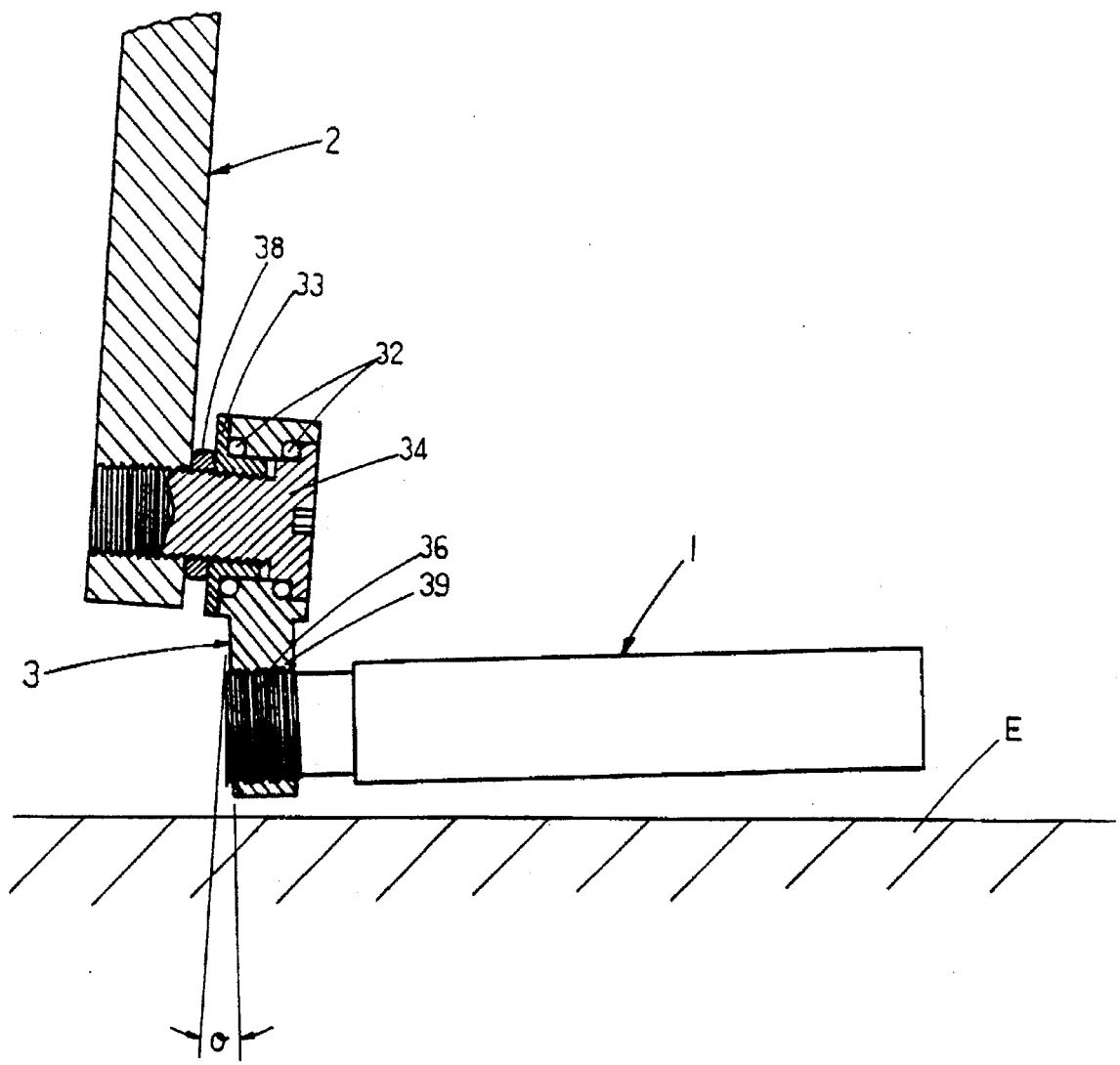

Furthermore, as indicated in FIGS. 3, 4 and 5, the threaded hole 36 of the auxiliary crank 3, provided for the installation of the pedal 1, has an axis that is at an inclination of approximately five degrees, the angle θ, from a horizontal plane. After the pedal 1 is installed into position, the outer end of the pedal 1 is likewise angularly offset. In addition to accommodating the soles of the bicycle rider's feet, the angular inclination of the pedals prevents the occurrence of outward slippage of the rider's feet and loss of frictional efficiency. Furthermore, the pedal's inclination concentrates the force of the rider's foot against the inside of the pedal 1 in the direction of the pedal crank 2, thereby enabling a maximum effective transfer of force. When the bicycle is being turned, and the rider leans the frame at an angle (referring FIG. 5), the outward inclination of the arm portion 39 of auxiliary crank 3 is advantageously utilized. The angular inclination of the pedal spaces at the outer end of the pedal 1 (referring to FIG. 3) further from the ground E, is such that the pedal 1 does not contact the ground, as indicated in FIG. 5, through a greater angle of lean of the bicycle frame. Therefore, the present invention, in actual practice, enables ensured operational safety and is of universal and practical value, in that it can be directly installed on any bicycle.

In summation, the present invention consists of a simple and improved structure of an ergonomic device for bicycles that demonstrably offers more advantages and effectiveness, while also solving the shortcomings of and improving on the prior art system disclosed in U.S. Pat. No. 610,923. Furthermore, the installation of the auxiliary crank 3 of the present invention is simple, convenient, rapid and safe.

What is claimed is:

1. An improved structure of an ergonomic device for a bicycle, comprising:

a pair of auxiliary cranks for respective coupling between a pedal cranks and pedals of the bicycle, each of said pair of auxiliary cranks having (a) a positioning collar formed on one end thereof for rotative coupling to a pedal mounting aperture of a respective one of said pedal cranks, and (b) an arm portion extending from said positioning collar, said arm portion being inclined approximately five degrees with respect to said positioning collar to extend outwardly away from the pedal crank, said arm portion having a threaded hole formed through a distal end thereof for securement of a respective one of said pedals thereto, said threaded hole having an axis orthogonal to said arm portion for upwardly inclining the pedal secured thereto approximately five degrees;

a pair of bearing assemblies, each of said pair of bearing assemblies being disposed within said positioning collar of a respective one of said pair of auxiliary cranks and having a threaded shaft extending therefrom for rotatively coupling said auxiliary crank to a respective one of the pedal cranks, each of said pair of bearing assemblies having a T-shaped extension sleeve threadedly engaged on said threaded shaft for adjusting tightness of said bearing assembly, each of said pair of bearing assemblies having a nut threadedly engaged on said threaded shaft and positioned in contact with said T-shaped extension sleeve for positionally retaining said T-shaped extension sleeve when said threaded shaft is being coupled to a respective one of the pedal cranks.

* * * * *